United States Patent [19]

Sasaki et al.

[11] Patent Number: 4,954,119
[45] Date of Patent: * Sep. 4, 1990

[54] SLIDING UNIVERSAL JOINT HAVING CYLINDRICAL HOLDER POSITIONING MEANS

[75] Inventors: Akira Sasaki; Seiji Esaki; Yasushi Hashimoto; Shigeo Kurita, all of Wako, Japan

[73] Assignee: Honda Giken Kogyo Kabushiki Kaisha, Tokyo, Japan

[*] Notice: The portion of the term of this patent subsequent to Jan. 2, 2007 has been disclaimed.

[21] Appl. No.: 212,535

[22] Filed: Jun. 28, 1988

[30] Foreign Application Priority Data

Jul. 1, 1987 [JP] Japan .................................. 62-101633

[51] Int. Cl.$^5$ ............................................. F16D 3/205
[52] U.S. Cl. ................................... 464/111; 464/123; 464/905

[58] Field of Search ................ 464/111, 123, 132, 905

[56] References Cited

FOREIGN PATENT DOCUMENTS 56-47413  11/1981  Japan .
57-13211   3/1982  Japan .
62-25098   2/1987  Japan .

Primary Examiner—Daniel P. Stodola
Attorney, Agent, or Firm—Armstron, Nikaido, Marmelstein, Kubovcik & Murray

[57] ABSTRACT

A restriction flange is provided on the inner end of each cylindrical holder in a sliding universal joint to keep the pair of cutouts which are provided for installation of the inner roller aligned with the longitudinal direction of the transmitting groove. The flange can be rectangular having appropriate side lengths to restrict any rotational motion of the cylindrical about it's center axis.

3 Claims, 2 Drawing Sheets

SLIDING UNIVERSAL JOINT HAVING CYLINDRICAL HOLDER POSITIONING MEANS

BACKGROUND OF THE INVENTION

The present invention relates to a sliding universal joint to be mounted at a bending portion of a bendable driving axle in an automobile, for example. More particularly the invention is directed to an improvement in a joint including a cylindrical outer member connected to one transmitting shaft and having an inner periphery formed with a plurality of transmitting grooves arranged circumferentially equally spaced from each other and extending axially, an inner member connected to another transmitting shaft and having a plurality of trunnions radially extending to project into the transmitting grooves, an inner roller slidably engaged with an outer periphery of each trunnion, a cylindrical holder having a spherical inner periphery relatively oscillatably engaging with a spherical outer periphery of each inner roller, and an outer roller rotatably supported to an outer periphery of each holder and engaged with the respective transmitting groove.

This type of universal joint is known as disclosed in Japanese Patent Publication No. 57-13211.

In the conventional joint, the spherical inner periphery of the holder is formed with a pair of opposed cutouts. In engaging the spherical outer periphery of the inner roller with the spherical inner periphery of the holder during assembly, the inner roller and the holder are arranged so that an axis of the inner roller is perpendicular to that of the holder. Under such a condition, the pair of opposed cutouts allow the inner roller to be inserted into the holder. That is, the inner roller is inserted into the cutouts, and is then oscillated at an angle of 90° so that the axis of the inner roller coincides with the axis of the holder.

However, as the holder is freely rotatable about its axis, the pair of cutouts are not limited as to the position that they can take during use. Accordingly, when the direction of arrangement of the cutouts becomes coincident with the direction of torque transmission between the outer member and the inner member, effective torque transmitting surfaces of the holder and the inner roller are widely reduced by the cutouts to cause a reduction in durability of the joint.

SUMMARY OF THE INVENTION

The present invention has been achieved to solve the above problem, and it is an object of the present invention to provide a sliding universal joint which may prevent a reduction in the effective torque transmitting surface of the holder and the inner roller.

According to the present invention, there is provided in a sliding universal joint wherein the spherical inner periphery of the holder is formed with a pair of opposed cutouts for installing the inner roller into the holder, the improvement comprising a positioning means provided between the holder and the outer member for positioning the holder so as to make the direction of arrangement of the pair of cutouts coincident with the longitudinal direction of the transmitting groove.

With this arrangement, the direction of arrangement of the pair of cutouts of the spherical inner periphery of the holder is always restricted to a direction perpendicular to the direction of torque transmission between the outer member and the inner member by the positioning means for positioning the holder. Therefore, the effective torque transmitting surfaces of the holder and the inner roller are hardly reduced by the cutouts.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENT

There will now be described a preferred embodiment of the present invention with reference to the drawings.

Figure 1:
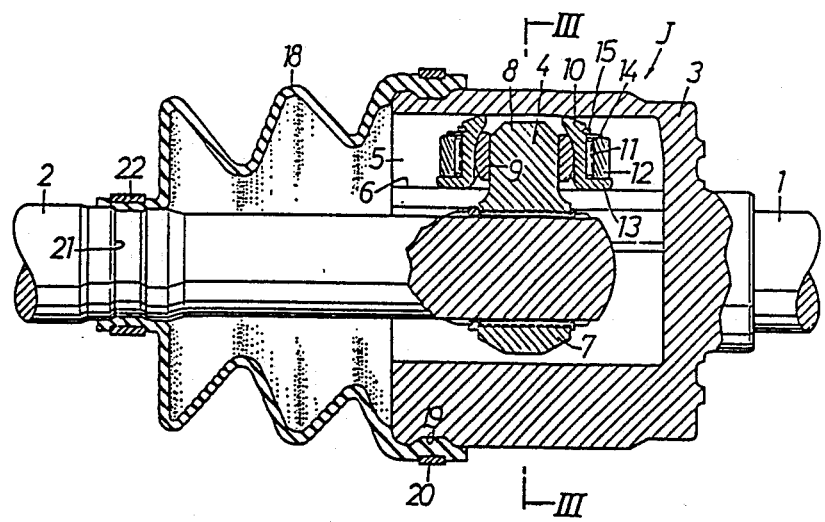
FIG. 1 is a vertical sectional view of the preferred embodiment of the sliding universal joint according to the present invention.
Figures 2, 3:
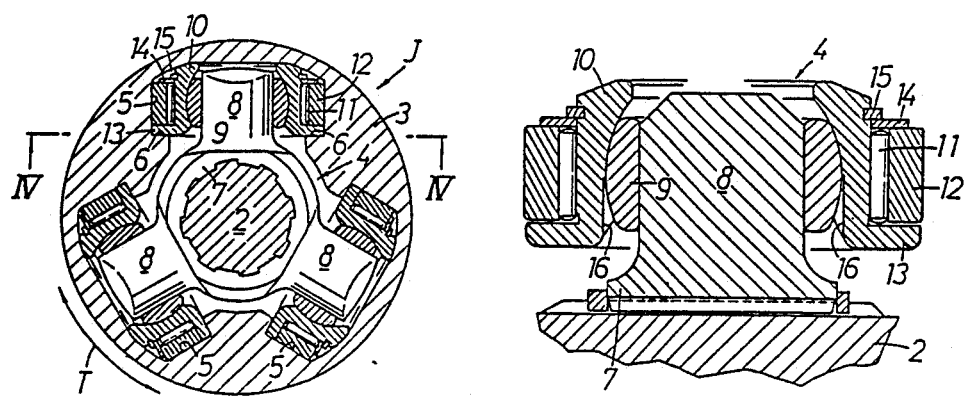
FIG. 2 is an enlarged view of the essential part in FIG. 1.
FIG. 3 is a cross section taken along the line III—III in FIG. 1.

Referring first to FIGS. 1 to 3, two transmitting shafts 1 and 2 are connected to each other through a sliding universal joint J of the present invention. The joint J primarily comprises a cylindrical outer member 3 integrally formed with an end portion of the transmitting shaft 1. The outer member 3 is open at one end thereof, and an inner member 4 fixed to an end portion of the transmitting shaft 2 is received in the outer member 3. The outer member 3 is formed on its inner peripheral surface with the three axially extending transmitting grooves 5 circumferentially equally spaced from each other. Each groove 5 is provided with a pair of rail portions 6 inwardly projecting from opposite inner side edges of the groove 5 toward an opening of the groove 5.

The inner member 4 fixed to the transmitting shaft 2 is formed with a boss 7. The boss 7 is integrally formed on its outer peripheral surface with three trunnions 8 projecting into the three transmitting grooves 5.

An inner roller 9 having a spherical outer periphery is slidably engaged with an outer periphery of each trunnion 8 in such a manner that a center of the inner roller 9 lies on an axis of the trunnion 8. A cylindrical holder 10 having a spherical inner periphery is relatively oscillatably engaged with the spherical outer periphery of the inner roller 9. A cylindrical outer roller 12 is rotatably supported through a needle bearing 11 on the outer periphery of the holder 10 and is rollingly engaged with the inner surface of the transmitting groove 5.

Figure 4:
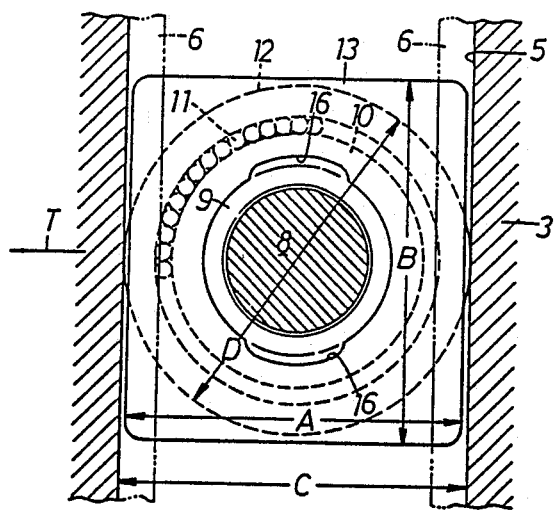
FIG. 4 is an enlarged cross section taken along the line IV—IV in FIG. 3.
Figure 5:
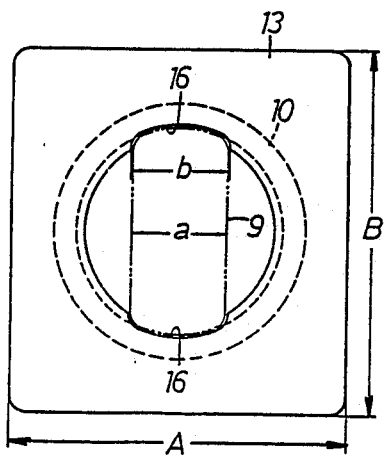
FIG. 5 is an end view of the holder as viewed from the restriction flange side.

As shown in FIGS. 3 to 5, the spherical inner periphery of the holder 10 is formed with a pair of opposed cutouts 16 for installing the inner roller 9. The pair of opposed cutouts 16 are so formed as to extend from one end of the holder 10 to a deepest position of the spherical inner periphery of the holder 10. The cutouts 16 have a width b slightly greater than an axial width a of the inner roller 9. Accordingly, when installing the inner roller 9 in the holder 10, the inner roller 9 is first arranged relative to the holder 10 in such a manner that an axis of the inner roller 9 is perpendicular to an axis of the holder 10, and the inner roller 9 is inserted into the cutouts 16 (see FIG. 5). Then, the inner roller 9 is oscillated at an angle of 90° so that the axis of the inner roller 9 coincides with the axis of the holder 10, thereby engaging the spherical outer periphery of the inner roller 9 with the spherical inner periphery of the holder 10.

The holder 10 is integrally formed at its inner end with a restriction flange 13 slidably abutting against the rail portions 6. A presser plate 14 is mounted at an outer end portion of the holder 10 by a circlip 15. The presser plate 14 cooperates with the restriction flange 13 to restrict axial movement of the outer roller 12. An outer end of the holder 10 slidably abuts against a bottom surface of the transmitting groove 5.

As shown in FIG. 4, the restriction flange 13 is formed in a rectangular shape so as to restrict a direction of arrangement of the cutouts 16 to a direction perpendicular to a torque transmitting direction T, that is, to a longitudinal direction of the transmitting groove 5. Further, the restriction flange 13 is slidably engaged with the transmitting groove 5.

Further, the restriction flange 13 has a side length A along a transverse direction of the transmitting groove 5 slightly smaller than an outer diameter D of the outer roller 12, and has the other side length B along the longitudinal direction of the transmitting groove 5 greater than a width C of the transmitting groove 5. Accordingly, as far as the direction of arrangement of the cutouts 16 is not made coincident with the longitudinal direction of the transmitting groove 5, the restriction flange 13 cannot be inserted into the transmitting groove 5. Thus, it is possible to prevent erroneous installation of the restriction flange 13 such that the direction of arrangement of the cutouts 16 is made coincident with the transverse direction of the transmitting groove 5.

Referring back to FIG. 1, a flexible boot 18 is provided between the outer member 3 and the transmitting shaft 2 to cover the front opening of the outer member 3. A rear end of the flexible boot 18 is engaged with an outer circumferential groove 19 of the outer member 3, and is tightened by a band 20, while a front end of the flexible boot 18 is engaged with an outer circumferential groove 21 of the transmitting shaft 2, and is tightened by a band 22.

In operation, when torque is applied to the transmitting shaft 1, for example, the torque is transmitted from the outer member 3 to the inner member 4, that is, from one side surface of the transmitting groove 5 through the outer roller 12, the holder 10 and the inner roller 9 to the trunnion 8 and the boss 7, and is finally transmitted to the transmitting shaft 2.

During such transmission of torque, the rectangular restriction flange 13 is restrained from rotation by the transmitting groove 5, and always restricts the direction of arrangement of the pair of cutouts 16 to the longitudinal direction perpendicular to the torque transmitting direction T. Accordingly, there is almost no possibility that an effective torque transmitting surface of the holder 10 and the inner roller 9 is reduced by the cutouts 16, but a large torque transmission can be effected between the holder 10 and the inner roller 9.

Further, the restriction flange 13 abuts against the rail portion 6 to thereby restrict inclination of the holder 10. Therefore, even when the trunnion 8 is inclined in the transmitting groove 5 by a bending operation of the transmitting shafts 1 and 2, the outer roller 12 supported by the holder 10 is not inclined, but can be smoothly rolled on the opposite side surfaces of the transmitting groove 5.

On the other hand, when the trunnion 8 is inclined, the inner roller 9 is oscillated relative to the holder 10 as slightly sliding on the trunnion 8, so that an inclination moment to be applied to the holder 10 may be made small.

Further, also in the case that both the transmitting shafts 1 and 2 are axially displaced, the outer roller 12 is not inclined, but can be smoothly rolled on the opposite side surfaces of the transmitting groove 5.

In the above preferred embodiment, the transmitting groove 5 and the restriction flange 13 constitute the positioning means of the present invention.

As described above, there is provided between the holder and the outer member, a positioning means for positioning the holder so as to make the direction of arrangement of the pair of cutouts coincident with the longitudinal direction of the transmitting groove. Therefore, the direction of arrangement of the cutouts does not vary. Accordingly, a large torque transmission between the holder and the inner roller may be achieved, and the durability of the holder and the inner roller may be improved.

It is readily apparent that the above-described meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. In a sliding universal joint including a cylindrical outer member connected to one transmitting shaft and having an inner periphery formed with a plurality of transmitting grooves arranged circumferentially equally spaced from each other and extending axially, an inner member connected to another transmitting shaft and having a plurality of trunnions radially extending to project into said transmitting grooves, an inner roller slidably engaged with an outer periphery of each trunnion, a cylindrical holder having a spherical inner periphery relatively oscillatably engaging with a spherical outer periphery of each said inner roller, and an outer roller rotatably supported to an outer periphery of each said holder and engaged with the respective transmitting groove, wherein said spherical inner periphery of each said holder is formed with a pair of opposed cutouts for installing said inner roller into said holder;
   the improvement comprising a positioning means provided between said holder and said outer member for positioning said holder so as to make the direction of arrangement of said pair of cutouts coincident with the longitudinal direction of said transmitting groove and retaining said pair of cutouts coincident with the longitudinal direction of said transmitting groove.

2. The improvement according to claim 1, wherein said positioning means comprises a flange provided on an inner end of said holder shaped so as to restrict rotational motion of said holder about its axis.

3. The improvement according to claim 2, wherein said flange is rectangular and has a first side length slightly smaller than a transverse dimension of the transmitting groove and a second side length larger than said transverse dimension, and said pair of cutouts are aligned with said second side length.

* * * * *